United States Patent Office 2,987,443
Patented June 6, 1961

2,987,443
PROCESS OF PRODUCING BIOSPLEN
Maxwell L. Littman, 16 Valley Place, Tenafly, N.J., and Michael A. Pisano, 102—33 Corona Ave., Corona 68, N.Y.
No Drawing. Filed Feb. 28, 1957, Ser. No. 642,966
1 Claim. (Cl. 167—74)

Our invention relates to a growth stimulatory substance and particularly to a new and useful growth stimulating compound, which we have termed "biosplen," and the process for preparing or producing the same. In 1955, one of us reported in the American Journal of Clinical Pathology, volume 25, page 1148, the presence in beef liver and beef spleen of heat-stable, water-extractible growth stimulatory substances for *Histoplasma capsulatum, Candida albicans* and other species of pathogenic fungi using a culture medium for fungi containing liver and spleen extractives to which were added thiotone, glucose, human bank blood, penicillin, streptomycin and agar. This culture medium supported the heaviest growth of fungi, when compared with other routine mycological culture media. In view of the finding that the greater part of the growth stimulatory effect of this culture medium for fungi originated in the spleen extract, an investigation was undertaken to isolate, purify and characterize the active growth principle from animal spleen.

EXPERIMENTAL PROCEDURES AND RESULTS

*Method of assay*

*Candida albicans* No. 712 was employed, in a chemically defined, vitamin-free, liquid culture medium, to follow the active growth principle through its various stages of purification and testing. The vitamin-free, synthetic liquid assay medium consisted of one percent glucose, 0.2 percent ammonium sulfate, 0.2 percent monobasic potassium phosphate (anhydrous), 0.02 percent $MgCl_2 \cdot 6H_2O$, 0.002 percent $CaCl_2 \cdot 2H_2O$, 0.004 percent $FeCl_3 \cdot 4H_2O$, 0.00015 percent $MnCl_2 \cdot 4H_2O$ and 0.00015 percent $NaMoO_4 \cdot 2H_2O$, all in double distilled water. The pH of the medium was adjusted to 7.0 with 1 N NaOH, which imparted a faint opalescence to the medium. The liquid medium was then distributed in 10 ml. quantities in chemically clean test tubes, each of which received an aluminum test tube cap prior to sterilization. The use of cotton plugs was avoided because of the possible impurities contained therein. The medium was autoclaved at 118° C. (12 lbs.) for 10 minutes.

Agar slants of the vitamin-free synthetic medium were prepared by adding sterile, melted 4 percent washed agar to sterile, double-strength, synthetic liquid medium as prepared above. Washed agar was prepared by soaking at 5° C., 20 grams of dehydrated agar (Difco) in 1000 ml. double distilled water, and renewing the water once weekly for a period of one month. The final washed agar was resuspended in 500 ml. of fresh double distilled water and autoclaved at 121° C. (15 lbs.) for 15 minutes.

Chemically clean glassware was employed throughout all phases of the purification and study of biosplen. Laboratory glassware was placed overnight in dichromate-sulfuric acid cleaning solution and was rinsed with successive changes of tap, single and double distilled water until acid-free, then air dried. Double distilled water was prepared in an all glass, distillation apparatus.

The assay organism was transplanted from yeast-extract agar slant (0.3 percent powdered yeast extract, 0.5 percent peptone, one percent glucose, 2 percent agar, pH 5–6) to slants of glucose synthetic agar, of the above formulation, and incubated at 20° C. With successive transplantation of the assay organism on glucose synthetic agar slants, the growth of the culture became increasingly sparse, which coincided with the depletion of the vitamins and nutriments contained within it. A suspension of the vitamin-depleted yeast cells in vitamin-free liquid synthetic assay medium was found to respond quantitatively to the addition of minute quantities of necessary growth factors, measured turbidimetrically by photoelectric colorimeter.

Growth factors for *Candida albicans* were reported by McVeigh and Bell in the Bulletin of the Torrey Botanical Club, volume 78, page 134, 1951, who demonstrated that in a chemically defined medium *Candida albicans* Y–475 required for maximal growth, the addition of 0.005 μg./ml. of biotin, 0.1 μg./ml. of thiamine and 20 μg./ml. of methionine. They reported no deficiencies of the organism in their medium for riboflavin, pantothenic acid, pyridoxine, para-amino-benzoic acid, nicotinic acid, pteroylglutamic acid, and inositol.

The growth of vitamin-depleted cells of our test organism, *Candida albicans* No. 712, was not stimulated separately by 0.1 μg./ml. of thiamine or by 20 μg./ml. of methionine, in vitamin-free glucose synthetic liquid medium, or by the addition of both 1 μg./ml. thiamine and 200 μg./ml. methionine. Our test organism did respond quantitatively, however, with growth and turbidity, to d-biotin in minimal concentrations varying from 0.001 to 0.0001 μg./ml., the variation representing a one tube difference in serial decimal dilution of the biotin. The organism also responded to biosplen, as outlined below.

*Technic*

Decimal serial dilutions of unsterile, but heat-stable, crude and purified spleen extracts under test were made with chemically clean pipettes in tubes of vitamin-free, glucose synthetic liquid assay medium. The tubes of medium were then sterilized by autoclaving at 118° C. (12 lbs.) for ten minutes. When they were cooled to room temperature, each tube received one drop of a suspension of vitamin-depleted yeast cells. This suspension had been prepared by the addition of 8 ml. of sterile, vitamin-free glucose, synthetic liquid assay medium to a vitamin-depleted culture of the organism previously grown sparsely on a vitamin-free, glucose, synthetic agar slant. A sterile clean platinum loop was employed to loosen the sparse growth of the yeast from the surface of the agar. The turbidity of the cell suspension measured 75 to 80 percent light transmission with the photoelectric colorimeter (Lumetron, model 400–A), using a red filter of 650 mu. The inoculum, one drop, represented approximately $0.5 \times 10^3$ yeast cells, and it did not impart detectable turbidity to the medium. Growth was measured turbidimetrically with the photoelectric colorimeter, after 14 and 30 days of incubation at 20° C.

Between stages of purification, the unsterile, aqueous spleen extracts were stored in the frozen state at $-20°$ C., while methanol spleen extracts were stored at 5° C. Dry spleen solids were stored under vacuum in a desiccator, initially at 5° C. and later at 20° C. when it was learned that the purified solids were stable at the latter temperature.

One biosplen unit is defined as the minimum quantity of biosplen contained in one ml., which stimulates sufficient growth of vitamin-depleted cells of *Candida albicans* No. 712 in a vitamin-free, glucose, synthetic liquid medium after 30 days incubation at 20° C. to cause a turbidity of approximately 85 percent light transmission, measured with the photoelectric colorimeter (Lumetron, model 400–A) using a red filter of 650 mu. One biosplen unit per ml. corresponds to 0.5 μg. biosplen per ml.

*Extraction and purification of biosplen*

(a) Crude source: Fresh beef spleens were stripped of their capsules, trimmed free of fat and ground thoroughly at room temperature in a clean meat grinder.

Spleens from other animals obtainable at an abattoir can be employed.

(b) Water extraction, enzymatic hydrolysis, autoclaving and filtration: To 1000 grams of ground and macerated spleen was added 2000 ml. of cool distilled water. The mixture was infused with occasional agitation at 50° C. for 60 minutes to allow the natural enzymes of the spleen sufficient contact time for maximal hydrolytic action. The mixture was then heated at 80° C. with agitation for five minutes to coagulate heat-precipitable proteins. While hot the infusion was filtered through layers of toweling, gauze and cotton. The filtrate was cooled to 10° C. to congeal remaining fat and refiltered through filter paper. This filtrate was autoclaved at 121° C. (15 lbs.) for 15 minutes during which additional heat coagulation of protein occurred. Autoclaving, however, did not reduce the growth stimulatory activity of the spleen extract for the assay organism. The coagulated proteins were removed by paper filtration. The splenic filtrate, at this point, measured pH 6.8 by glass electrode.

(c) Lyophilization: One liter of crude spleen extract derived according to the method described in (b) was shell frozen in convenient volumes in a mixture of methyl cellosolve (ethylene glycol monomethyl ether) and Dry Ice and lyophilized in a glass modified Campbell Pressman lyophilizing unit. A tan amorphous powder was obtained weighing 23.5 grams, which was stored under vacuum in a desiccator at 5° C.

(d) Methanol extraction and pentane squeeze: The dry solids obtained in (c) were extracted with 1000 ml. of anhydrous methanol, C.P. for 25 minutes, at 20° C., employing mechanical stirring. The mixture was then vacuum filtered in a Buchner funnel through Whatman No. 1 filter paper. The light tan residue on the filter paper was negative on microbiological assay and it was discarded. The amber-colored methanol filtrate, containing the active principal, was mixed at 20° C. in a separatory funnel with an equal volume of pentane (Eastman, technical) and shaken intermittently for 10 minutes. A heavy white flocculent precipitate formed in the lower methanol layer and this was drawn off with the methanol. The active principal remained in the methanol solvent. The white precipitate was separated from the methanol by paper filtration (Whatman No. 1) and after a negative assay, it was discarded. The pentane layer was negative on microbiological assay.

(e) Vacuum distillation and steam evaporation: The methanol filtrate was reduced in volume in vacuo at 60° C. to 125 ml. in an all glass vacuum distillation apparatus. This distillate was negative on assay. The residual methanol solution was reduced to dryness over a steam bath, and the solids thus obtained were maintained under vacuum in a desiccator at 5° C. At this point the solids were dark brown in color and weighed 9.36 grams.

(f) Dialysis, vacuum distillation and lyophilization: Methanol soluble solids obtained in (e) were dissolved in 100 ml. double distilled water and dialyzed at 5° C. through transparent, seamless, cellulose dialyzer tubing (Thomas-4465 A2) into a stationary water bath containing 350 ml. double distilled water. The water bath was renewed with double distilled water four times and the four dialysates were collected after consecutive dialyzing periods of 2, 12, 8 and 36 hours and stored in the frozen state at $-20°$ C. The non-dialyzable residue which remained within the cellulose tubing was negative on microbiological assay and it was discarded. The combined dialysates, totalling 1400 ml. were concentrated in vacuo at 60° C. in an all glass distillation apparatus to a volume of 25 ml., and then lyophilized. The vacuum distillate was negative on assay. The lyophilate, containing the active principal, was a light brown powder and weighed 6.66 grams.

(g) Separation by one-dimensional paper partition chromatography: One gram of the powder obtained in (f) was further purified by means of ascending one dimensional paper partition chromatography. A 10 percent solution of the powder in double distilled water was applied with a finely drawn capillary pipette to 4 cm. wide strips of filter paper (Whatman No. 1). Approximately 1.4 milligrams of the dissolved material was applied in a horizontal streak at a point 2.5 cm. above the lower edge of each paper strip, and its location was marked when dry, with a light pencil mark. Approximately 600 strips of paper were required to distribute a solution containing one gram of the spleen powder for chromatography. Loaded and dry paper strips were chromatographed at 20° C. by the ascending technic in glass covered battery jars measuring 22 x 45 cm. and containing the solvent system: Redistilled n-butanol:redistilled n-propanol:double distilled water=1.5:1:1 v./v. The glass covered jars were allowed to become saturated with the vapor of the solvent mixture for 24 hours prior to chromatographic separation. The lower edges of the paper strips were immersed for a distance of 1 cm. beneath the surface of the solvent mixture and the mixture allowed to travel up the paper strip in the covered chamber at 20° C. for a distance of exactly 10 cm. beyond the line of application of the methanol-extracted spleen material, which required between 2½ to 4 hours. The paper strips were removed from the battery jars, dried in air at 20° C., and then were examined in a dark room with ultra violet light (Mineralight, Model V-41, Machlett & Sons, No. 50-242). It was observed that the methanol-extracted spleen material had separated into 8 distinct fluorescent bands, some of which fluoresced more strongly than others. With ultra violet light as a guide, the position of each of these bands on all 600 paper chromatograms was demarcated with a faint pencil mark.

The location of the growth stimulatory principle within the chromatogram was detected by bioautographic assay, by overlaying the paper chromatogram on a plate of vitamin-free, glucose synthetic agar seeded with the vitamin-depleted test organism, *Candida albicans* No. 712, and incubating for 30 days at 20° C. A dense oval zone of growth appeared within the agar in the area surrounding the front running bands 6 and 7 corresponding to $R_F$ 0.58 to 0.93. The component in the most rapidly moving band 8, and those in the slower moving bands, designated as bands 1 to 5 inclusive, failed to stimulate growth of the organism.

Since the growth stimulatory principle was ninhydrin negative, the ninhydrin test was employed to provide an additional means of locating the growth principle on the now pencil-marked chromatograms. Narrow, longitudinal, representative strips of each chromatogram were cut away with clean shears and these were sprayed with a solution of 0.5 percent ninhydrin (triketohydrindene hydrate) in water saturated n-butanol, following which they were dried in a current of warm air and developed in an oven at 110° C. for 4 minutes. Bands 6 and 7, containing the active growth principle were ninhydrin negative and were colorless, as was band 8. Bands 1 to 5 inclusive contained amino acid nitrogen and were colored various shades of violet. By placing the narrow ninhydrin-sprayed test strips alongside each pencil-marked, but otherwise untreated chromatogram, the exact locations of bands 6 and 7 were ascertained. These were cut away with clean shears from all 600 paper chromatograms and collected in a chemically clean glass vessel.

(h) Elution, vacuum distillation and lyophilization: The combined 600 paper sections containing the active growth principle, biosplen, were eluted successively with 1000 ml. and 500 ml. of double distilled water for 10 minutes at 20° C. with mechanical stirring. The resulting filter paper slurry was vacuum filtered in a Buchner funnel through Whatman No. 1 filter paper. The filtrate, containing biosplen, was concentrated in vacuo at 60° C.

to a volume of 50 ml., and then lyophilized. The solids at this point were white in color, had a sweet aromatic odor and slightly bitter taste and weighed 44 milligrams. They were stored under vacuo in a desiccator at 20° C. Based on this yield, one liter of crude spleen extract, or 500 grams of ground spleen was estimated to contain 300 milligrams biosplen when isolated and purified by the above procedure. Upon microbiological assay with vitamin-depleted cells of *Candida albicans* No. 712, in vitamin-free, glucose, synthetic liquid medium, one milligram of the purified solid, biosplen, was found to contain 2000 biosplen units, or 2 million units per gram of biosplen.

Physical properties of biosplen

Biosplen is a white, hygroscopic, amorphous powder, possessing a slightly bitter taste and a characteristic sweet, aromatic odor. The compound has no definite melting point, but begins to decompose at 171° C., is 50 percent decomposed at 182° C. and is almost completely charred at 206° C. Biosplen is soluble in water, methanol and ethanol and insoluble in diethyl ether, chloroform and pentane. The ultra violet absorption spectrum of biosplen at a concentration of 200 $\mu$g./ml. (0.02%) in double distilled water exhibits a minimum at 2400 A. and a maximum at 2760 A., while d-biotin (Hoffmann-La Roche, Inc.) at a concentration of 1000 $\mu$g./ml. (0.1%) in the same solvent exhibits no characteristic minimum or maximum. Biosplen exhibits characteristic absorption bands in the infra red region of the spectrum when incorporated in a KBr disc at the following frequencies expressed in reciprocal centimeters: 3445, 3390, 3245, 3165, 3100, 2965, 2935, 2900, 1720, 1701, 1667, 1652, 1616, 1602, 1598, 1562, 1546, 1521, 1495, 1461, 1419, 1400, 1383, 1312, 1276, 1269, 1260, 1222, 1198, 1167, 1119, 1102, 1091, 1037, 951, 925, 862, 857, 817, 797, 777 and 766, with the strongest bands at 3445, 3390, 1616, 1602, 1598, 1383, 1119, and 1037, and shoulder bands in the ranges 3550-3000 and 1780-1530. The KBr disc was prepared by mixing approximately 2 mg. of biosplen with 998 mg. KBr powder (infra red grade, Harshaw Chem. Co.) in a Wig-L-Bug vibrator for 5 minutes, following which 300 mg. of the resulting mixture was compressed under 23,000 lbs. per square inch pressure in a split-cone evacuable die while being evacuated. This produced a transparent disc, 1.0 mm. thick with biosplen in 0.2 percent concentration. The resulting spectrum showed only very slight scattering. The biosplen obtained thus far contains in each gram, 2 million units of growth stimulatory activity for vitamin-depleted cells of *Candida albicans* No. 712, assayed in vitamin-free, glucose, synthetic liquid medium.

*Stability.*—Although biosplen is hygroscopic, it is a very stable compound, being unaffected in aqueous solutions by either boiling or freezing. Autoclaving of aqueous solutions of the compound at 121° C. for 15 minutes fails to reduce any of its growth stimulatory activity for *Candida albicans* No. 712. Biosplen also suffers no loss of activity for the test organism when autoclaved at 121° C. for 90 minutes in the presence of dilute hydrochloric acid or hydrogen peroxide or when maintained with each of these reagents for several hours at 20° C. It suffers no loss of activity for this organism when kept in the frozen state for months in aqueous solutions at $-20°$ C. The growth activity of biosplen is further unaffected by filtration through ultra-fine Pyrex glass bacterial filters and by dialysis through cellulose dialyzing tubing. It is stable in methanol when stored at 5° C. and stable for months in the dry state when stored at 20° C. under vacuum in a desiccator.

Chromatographic $R_F$ determinations by bioautography in liquid medium

*Technic.*—Aqueous solutions of biosplen and d-biotin were loaded on paper strips (Whatman No. 1), dried in air, and were chromatographed to a distance of exactly 140 mm. in the following solvent systems:

(1) n-butanol:n-propanol:water=1.5:1:1 v./v.
(2) water:n-butanol:glacial acetic acid=5:4:1 v./v.
(3) methanol:n-propanol:water=1.5:1:1 v./v.
(4) n-butanol:methanol:water=1.5:1:1 v./v.

After removal of the solvent by air drying, the paper chromatograms intended for bioautography were cut with clean shears into 14 sections, 10 millimeters each, with each section representing 0.07 of an $R_F$ unit. The paper sections were then individually eluted for two hours at 20° C. in separate 10 ml. quantities of sterile, vitamin-free, glucose, synthetic liquid medium in aluminum-capped test tubes, following which the paper sections were removed and discarded. The tubes of media were resterilized by autoclaving at 118° C. for 10 minutes. Each tube when cooled, received one drop of a suspension of vitamin-depleted test organism. The resultant growth was measured turbidimetrically after 14 and 30 days of incubation at 20° C. and the $R_F$ values of the two compounds were calculated from the regions of growth stimulatory activity.

A constant, reproducible, well-defined, single region of activity of biosplen was observed in the bioautograph with each one of the solvent systems. The bioautograph in vitamin-free, glucose, synthetic liquid medium in solvent system No. 1, which corresponded to that employed for the separation and purification of biosplen, gave a fairly broad single region of growth stimulatory activity beginning at $R_F$ 0.57 and extending to 0.93, with an average value of 0.73. This measurement agreed very closely with that obtained in the bioautograph in vitamin-free, glucose, synthetic agar. In the latter assay, a chromatographed paper strip containing biosplen as well as other methanol-soluble spleen components, caused growth stimulatory activity for vitamin-depleted cells of *Candida albicans* No. 712 at $R_F$ values on the strip beginning at 0.58 and extending to 0.93 (see section (g) of "Isolation and purification of biosplen").

Bioautograph of d-biotin in similar solvent systems, similar substrate and the same environmental conditions, yielded $R_F$ values different from biosplen, in each instance. The greatest difference in $R_F$ values between the two compounds was observed in the solvent system n-butanol: n-propanol: water=1.5:1:1 v./v., in which the average $R_F$ for biosplen was 0.73 while that for d-biotin was 0.82.

Chemical properties of biosplen

Elemental analysis of biosplen by microanalytic methods revealed carbon 29.81 percent, hydrogen 4.96 percent, nitrogen 3.54 percent, sulfur 2.76 percent, and absence of phosphorus. Duplicate elemental analysis revealed carbon 30.34 percent and hydrogen 4.72 percent.

The ninhydrin test for amino acid nitrogen was negative when it was applied to biosplen. This was conducted by spraying a solution of 0.5 percent ninhydrin in water-saturated n-butanol over spots of biosplen dried on Whatman No. 1 filter paper, following which the paper strip were dried in a current of warm air and developed in an oven at 110° C. for 4 minutes. Control strips containing amino acids yielded varying shades of violet, while that with biosplen remained colorless.

A test for neutral fat was negative when it was applied to biosplen. This was performed by treating spots of the compound dried on Whatman No. 1 filter paper with a 0.3 percent solution of Sudan Black B in 70 percent ethanol, followed by ethanol rinse. Biosplen spots remained colorless, while control fatty preparations were strongly positive with the same reagent and developed a black color.

Tests for reducing sugars were negative when applied to biosplen. Both ammoniacal silver nitrate and triphenyltetrazolium chloride spray tests were performed with spots of biosplen dried on Whatman No. 1 filter paper, following the technic outline by R. J. Block, E. L. Durrum, and G. Zweig in "A Manual of Paper Chromatography and Paper Electrophoresis," pp. 132, 133, Academic Press, New York, 1955. Spots of biosplen remained colorless with the test reagents, while control paper strips containing spots of known reducing sugars were strongly positive.

The Beilstein flame test of biosplen for halogens was negative.

Since the ultra violet absorption spectrum of biosplen exhibits a maximum at 2670 A., which is in the range characteristic also for purines and pyrimidines, tests for the detection of the latter compounds in biosplen were undertaken. Spray tests for the detection of nucleotides proved to be unsatisfactory. Negative test for purines in biosplen was obtained, however, with the mercuric nitrate test, while control strips containing spots of known purines were strongly positive. The latter test was performed according to the technic outlined by E. Vischer and E. Chargaff in Journal of Biological Chemistry, volume 168, page 781, 1947 and by Block, Durrum and Zweig in "A Manual of Paper Chromatography and Paper Electrophoresis" page 217. In order to estimate the growth stimulatory activity of nucleotides on our test organism, because of the similar ultra violet absorption to biosplen, the growth activity of known nucleotides was assayed with vitamin-depleted cells of Candida albicans No. 712. The nucleotides, uridylic acid, cytidylic acid, adenylic acid and guanylic acid, failed, however, to produce measurable growth of the test organism in concentrations of nucleotide ranging from 0.0001 to 100 $\mu$g./ml., in vitamin-free, glucose, synthetic liquid medium, within a 30 day incubation period at 20° C.

*Binding effect of raw egg-white.*—Raw egg-white produced a binding action in-vitro on biosplen, rendering the latter biologically inactive for Candida albicans No. 712. The growth stimulatory action of biosplen at a concentration of 5 $\mu$g./ml. (10 biosplen units) in vitamin-free, glucose, synthetic liquid medium was found to be completely inhibited in-vitro by $10^{-1}$, $10^{-2}$ and $10^{-3}$ dilutions of sterile, raw egg-white, partially inhibited by $10^{-4}$ and $10^{-5}$ dilutions and uninhibited at higher dilutions. Although the biological inactivation of biotin in-vitro by egg-white is attributed to the formation of a fairly stable compound of biotin with avidin, a protein-like constituent of egg-white (R. E. Eakins, E. E. Snell and R. J. Williams in Journal of Biological Chemistry, volume 136, page 801, 1940, and volume 140, page 535, 1941), the mechanism of the binding action of biosplen with egg-white was not determined. In view of the similarity in binding action of biosplen and biotin by egg-white, despite the failure of György, Kuhn and Lederer (Journal of Biological Chemistry, volume 131, page 733, 1939) to find biological biotin activity in spleen fed to rats on an egg-white diet, an assay of biosplen was undertaken with biotin-requiring protozoan species, in order to determine what percentage of biotin, if any, was contained within biosplen.

*Biological properties of biosplen*

(a) Assay of biosplen with protozoa: The species of protozoa, *Tetrahymena pyriformis*, Strain No. 2 and *Ochromonas malhamensis*, both of which require biotin or biotin-derivatives for growth, were grown in a series of flasks in a biotin-free synthetic liquid protozoan culture medium which contained the vitamins, thiamine and Vitamin $B_{12}$ (modified from the formula of Hutner et al., 1950) plus biosplen in concentrations varying from 0.01 to 0.5 $\mu$g./ml. A parallel series of flasks containing the same culture substrate plus biotin in concentrations ranging from 0.000001 to 0.001 $\mu$g./ml. served as the control. Flask cultures were maintained under a bank of warm white fluorescent lights at temperatures which averaged 25° C. After 7 and 6 days of incubation respectively, the growth produced by each of the above species of protozoa was measured turbidimetrically and directly as optical density in a Welch Densichron, using a red-sensitive photo tube. The results indicate that biosplen possesses growth stimulatory activity for both species of protozoa at the same relative concentration in the protozoan culture medium as it does for Candida albicans No. 712 in a vitamin-free, glucose, synthetic liquid medium, e.g. 0.5 $\mu$g./ml. Expressed in terms of biotin, however, the growth activity of biosplen for the protozoan species is exceedingly low since it requires 500,000 parts of biosplen to supply one part of "biotin" activity. In view of the fact that the growth of the protozoan species produced by 0.5 $\mu$g./ml. of biosplen was equal to that produced by only 0.000001 $\mu$g./ml. biotin, it can be safely assumed that the stimulatory effect of biosplen on Candida albicans is not attributable to any "biotin" contained within biosplen, and that the biotin assay of biosplen is for practical purposes, negative. A further confirmation of this point is to be found in the fact that the limiting concentration of d-biotin which is growth stimulatory for Candida albicans No. 712 in vitamin-free, glucose, synthetic liquid medium, varies from 0.001 to 0.0001 $\mu$g./ml. (on four separate determinations) the variation representing a one tube difference in serial decimal dilutions of the biotin.

(b) Assay of biosplen with yeasts: Biosplen in concentration of 0.5 $\mu$g./ml. is growth stimulatory to vitamin-depleted cells of Candida albicans No. 712 in a vitamin-free, glucose, synthetic liquid medium. The quantitative response of this species of yeast to biosplen provided the basis of the assay technic of biosplen, described under "Method of Assay, Experimental Procedures and Results," and furnished an effective means of following the active growth principle, biosplen, through its various stages of purification and testing. Biosplen was also found to be growth stimulatory to vitamin-depleted cells of *Saccharomyces cerevisiae*, NRRL Y–567 and *Cryptococcus neoformans* D strain at levels of 5 $\mu$g./ml. and 10 $\mu$g./ml., respectively, in vitamin-free, glucose, synthetic liquid medium.

SUMMARY

A new and useful growth stimulatory substance, biosplen, has been discovered in the spleen. This substance has been isolated and purified and has been characterized by numerous physical, chemical and biologic technics. Purification of biosplen was accomplished to a white powder having a growth activity of 2 million units per gram for vitamin-depleted cells of Candida albicans No. 712, in a vitamin-free, glucose, synthetic liquid medium. A biological method of quantitative assay of biosplen was developed. The physical, chemical and biological properties of biosplen are sufficiently distinctive to enable its clear differentiation from all other known vitamins and growth factors. Biosplen resembles biotin in its heat stability and its binding by raw egg-white but differs markedly in many physical, chemical and biological properties, such as ultra violet spectrum, infra red spectrum, melting point, elemental analysis, chromatographic $R_F$ values, solubilities and biological activity to protozoan and yeast species.

Other steps in the purification process of biosplen may be employed, the above purification procedures being illustrative examples. In describing a technic of purification of biosplen, we are not unmindful of the fact that other temperatures and times may be employed for enzymatic hydrolysis, and that other similar hydroxyl containing solvents may be substituted for water and for methanol. Alcohols containing 1–4 carbon atoms are examples. It is of course intended that the equivalent type of solvents shall be embraced herein. We are also aware that types of dialyzing membranes other than cellulose tubing may be employed, also that in place of paper partition chromatography, other similar differential solvent separation procedures such as column chromatography and counter current separation may be also as effective in separating biosplen from other spleen components. It is of course intended that equivalent types of dialysis, dehydration, physical separation procedures and other like purification processes shall be embraced herein. Although the complete process of purification was described for beef spleen, other animal spleens such as obtainable at an abattoir have been examined by us and found to contain biosplen. It is of course intended that the process of purification shall embrace animal spleen, rather than that of only one animal species.

The product of the present invention (biosplen) can be used to stimulate the rapid growth of fungi and can be employed advantageously in the clinical identification of pathogenic fungi, e.g. *Candida albicans, Histoplasma capsulatum*, etc. Cultivation of isolated fungi at 37° C. in nutrient glucose agar mediums such as described above and containing 0.5–10.0 μg./ml. of biosplen makes it possible, for example, to readily grow and identify fungi in a matter of a few days instead of weeks as required heretofore. Attempts to accomplish this by the use of crude spleen extracts are particularly objectionable as tests cannot be standardized and results are not reproducible. These disadvantages are overcome by the use of biosplen.

The high growth stimulatory effect on yeasts of biosplen in a chemically defined culture medium makes possible the rapid production of yeast cells for products such as commercial yeast cake, yeast extracts, etc., and eliminates the need for supplying additional vitamins to the culture medium. Crude animal spleen extracts are unsatisfactory for this purpose since they contain many undesirable impurities as well as fail to possess the high growth potency of biosplen.

The high growth stimulatory effect of biosplen obviously indicates its value in animal and human nutrition and disease.

The particular characteristics and attributes, both of the product and the process, are detailed in the claim which follows.

We claim:

In a process for the production of a growth stimulatory substance, useful for growing pathogenic fungi, from animal spleen which comprises grinding the spleen, mixing the ground spleen with water, allowing the resulting aqueous spleen mixture to stand at about 50° C., heating the resulting mixture to about 80° C., and separating the resulting coagulated heat-precipitable proteins from the resulting aqueous solution, the improvement which consists in lyophilizing the aqueous solution, mixing the resulting dry solid with methanol, separating the undissolved inactive material from the resulting methanol solution, adding about an equal volume of pentane to the methanol solution, shaking the resulting mixture, separating the resulting inactive precipitate and pentane from the methanol layer and recovering the growth stimulatory substance by evaporating the methanol.

References Cited in the file of this patent

Littman: Am. J. of Clin. Path., vol. 25, July–December, 1955, pp. 1148–1150 and 1158.